US012798029B2

(12) United States Patent
Alva

(10) Patent No.: US 12,798,029 B2
(45) Date of Patent: Nov. 17, 2026

(54) SYSTEM FOR PROCESSING A SLAB HAVING A TOP POLISHED FACE AND RELATED METHOD

(71) Applicant: POSEIDON INDUSTRIES, INC., Punta Gorda, FL (US)

(72) Inventor: Jose Antonio Alva, North Port, FL (US)

(73) Assignee: POSEIDON INDUSTRIES, INC., Punta Gorda, FL (US)

( * ) Notice: Subject to any disclaimer, the term of this patent is extended or adjusted under 35 U.S.C. 154(b) by 322 days.

(21) Appl. No.: 18/754,258

(22) Filed: Jun. 26, 2024

(65) Prior Publication Data

US 2024/0399524 A1 Dec. 5, 2024

Related U.S. Application Data

(63) Continuation-in-part of application No. 18/327,101, filed on Jun. 1, 2023, now Pat. No. 12,539,645.

(51) Int. Cl.

| | |
|---|---|
| ***B23Q 16/12*** | (2006.01) |
| ***B23Q 17/24*** | (2006.01) |
| ***B28D 1/22*** | (2006.01) |
| ***B28D 7/04*** | (2006.01) |

(52) U.S. Cl.

CPC ......... *B23Q 16/12* (2013.01); *B23Q 17/2419* (2013.01); *B28D 1/22* (2013.01); *B28D 7/046* (2013.01)

(58) Field of Classification Search

None

See application file for complete search history.

(56) References Cited

U.S. PATENT DOCUMENTS

| | | | | |
|---|---|---|---|---|
| 7,241,981 | B2 | 7/2007 | Hofmann | |
| 10,467,352 | B2 | 11/2019 | Czmyrid et al. | |
| 11,244,086 | B2 | 2/2022 | Czmyrid et al. | |
| 2006/0016957 | A1* | 1/2006 | Hofmann | A43D 95/14 250/201.1 |
| 2015/0083103 | A1 | 3/2015 | Calas | |
| 2022/0300668 | A1 | 9/2022 | Czmyrid et al. | |
| 2023/0019907 | A1 | 1/2023 | Mantenuto | |
| 2024/0391265 | A1* | 11/2024 | Xie | B44C 1/1704 |
| 2025/0367854 | A1* | 12/2025 | Patki | B28B 11/001 |

* cited by examiner

*Primary Examiner* — John E Breene

*Assistant Examiner* — Daniel M Quinn

(74) *Attorney, Agent, or Firm* — ALLEN, DYER, DOPPELT + GILCHRIST, P.A.

(57) ABSTRACT

A system processes a stone slab having a top polished face and bottom surface. An imaging device receives and displays a digital image of the top polished face of the slab. A controller overlays a slab cut layout on the digital image of the top polished face, generates a digital slab layout file containing digital data representative of the top polished face and its slab cut layout referenced to the top end of adhered reference markers, mirror images the digital slab layout file, and projects the mirror imaged locations of the reference markers to facilitate alignment of the bottom ends of the adhered laser markers with the respective projected reference marker locations when the slab is upside down for cutting in a slab cutting position.

23 Claims, 16 Drawing Sheets

SYSTEM FOR PROCESSING A SLAB HAVING A TOP POLISHED FACE AND RELATED METHOD

PRIORITY APPLICATION(S)

This is a continuation-in-part patent application based on U.S. patent application Ser. No. 18/327,101 filed Jun. 1, 2023, the disclosure which is hereby incorporated by reference in its entirety.

FIELD OF THE INVENTION

The present invention relates to the field of stone processing, and more particularly, this invention relates to processing a stone or a stone-like slab having a top polished face and associated methods.

BACKGROUND OF THE INVENTION

A stone or stone-like slab is commonly used in building construction. For example, granite, quartz, marble, soapstone, engineered stone, and other quarried stones are often selected for use as flooring, tables, countertops, and kitchen sinks. These stone slabs may also be formed from a combination of natural and synthetic materials and include binders, and have improved qualities and aesthetic characteristics, reproducibility, and stain-resistant or heat-resistant properties. Stone slabs usually have certain features that must be taken into account during processing, which includes cutting and fabrication, especially for countertops, kitchen sinks and other end use applications that require high aesthetic consideration. For example, the stone slabs may have grain, i.e., vein patterns, that dictate the desired positioning of a countertop or similar product to be cut from the stone. The countertop may be more aesthetically pleasing if the grain pattern extends in a certain direction. Other cut sections from the same or similar stone slab that are arranged in the same location in the home should match the vein pattern.

A digital representation of a stone slab is used to facilitate or automate stone slab selection and cutting. For example, a vein-matching software employing a photo image of the slab may be used to layout a slab cut layout pattern based on the vein pattern. An example software program is Slabsmith by Northwood Designs. A customer, stone processor or contractor may view a digital image of the top polished surface of the stone slab using the software, such as Slabsmith, and generate a slab cut layout on the image of the slab of how pieces will be cut from the slab relative to the polished surface of the slab and its vein pattern. Usually, this layout is used to match physical references with a zero origin point for positioning the slab onto a table where a machine cuts the stone slab with the polished face up.

If the slab were to be turned upside down, however, with the polished face down, which is not the normal slab cutting position, then it is difficult to position the slab relative to the slab cut layout based on the software program. Positioning a stone slab upside down for cutting when positioning is critical has been found challenging or close to impossible where the machine is programmed for a slab cut pattern based upon the slab cut layout on the top polished face using a software program such as Slabsmith.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

In general, a system of processing a stone or a stone-like slab having a top polished face and bottom surface may comprise an imaging device configured to receive and display a digital image of the top polished face of the slab. The slab includes side edges and a plurality of adhered reference markers on at least one side edge of the slab. Each of the plurality of adhered reference markers are the thickness of the slab and have a top end and a bottom end flush with the respective top polished face and bottom surface. A controller may be connected to the imaging device and configured to overlay a slab cut layout on the digital image of the top polished face, generate a digital slab layout file therefrom containing digital data representative of the top polished face and its slab cut layout referenced to the top end of the adhered reference markers, mirror image the digital slab layout file, and project the mirror imaged locations of the reference markers to facilitate alignment of the bottom ends of the adhered laser markers with the respective projected reference marker locations when the slab is upside down for cutting in a slab cutting position.

In an example, a computer numerical control (CNC) slab processing machine may have a work surface on which the slab is positioned upside down with respect to the mirror imaged digital slab layout file. The CNC slab processing machine may comprise a spindle and cutting blade mounted on the spindle. A coupling cone may be configured to mount the cutting blade to the spindle. The CNC slab processing machine may comprise vacuum pods on which the top polished face of the slab is positioned for upside down cutting.

In another example, a laser projector may be configured to project the mirror imaged locations of the reference markers. Each reference marker may comprise a cylindrically shaped foam element. The slab may comprise opposing short sides and opposing long sides, at least one long side includes at least two adhered reference markers and at least one short side includes at least one adhered reference marker. The digital slab image file may comprise a vector file. The vector file may comprise a Drawing Exchange Format (DXF) file.

A method of processing a stone or a stone-like slab having side edges and a top polished face and bottom surface may comprise adhering a plurality of reference markers on at least one side edge of the slab, each of the plurality of adhered reference markers being the thickness of the slab and having a top end and a bottom end flush with the respective top polished face and bottom surface. The method further includes overlaying a slab cut layout on the top polished face and generating a digital slab layout file therefrom containing digital data representative of the top polished face and its slab cut layout referenced to the adhered reference markers, mirror imaging the digital slab layout file and projecting the mirror imaged locations of the reference markers when the slab is to be positioned in an upside down slab cutting position, and aligning the bottom ends of the adhered laser markers with the respective projected reference marker locations for upside down cutting of the slab.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
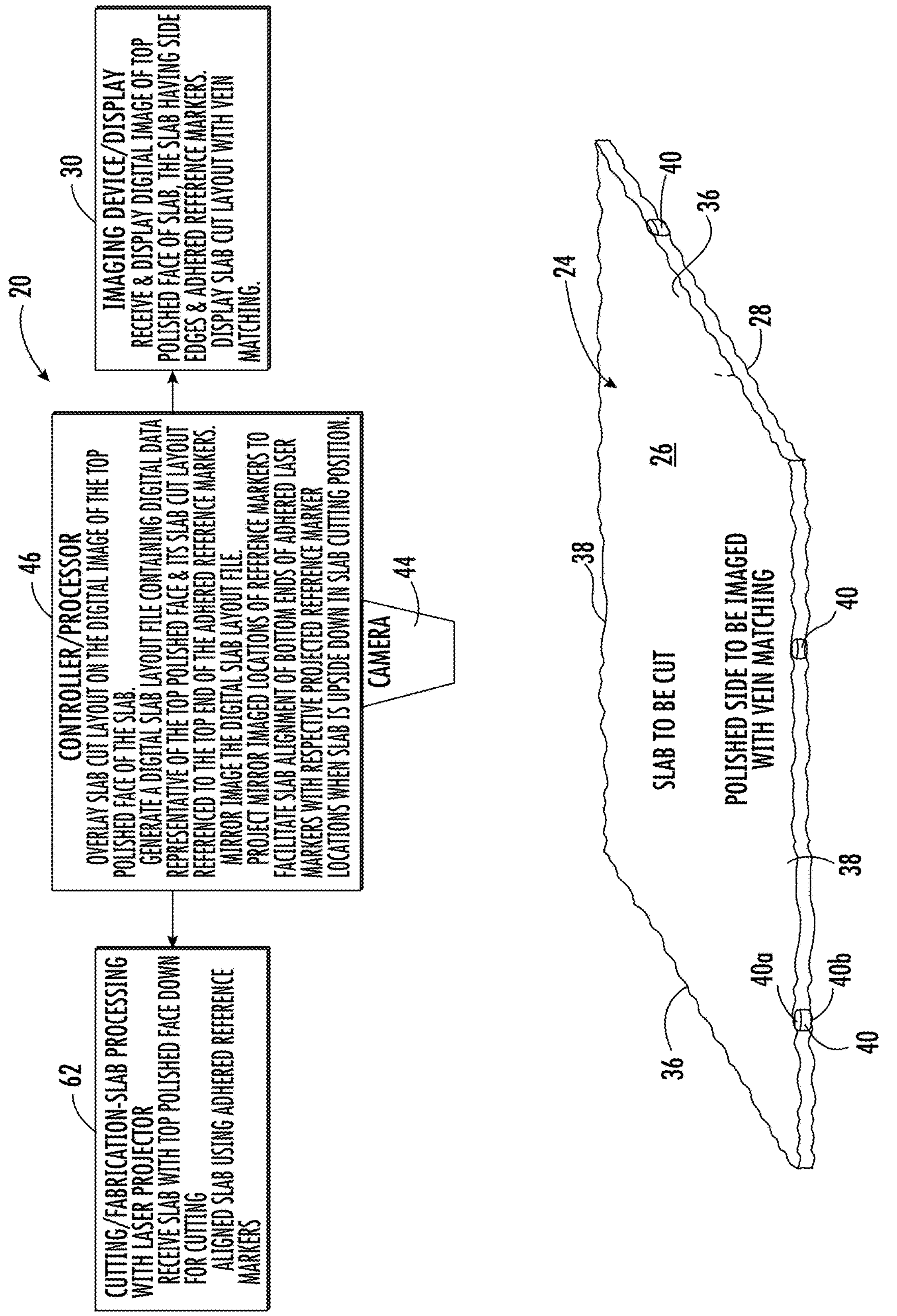
FIG. 1 is a schematic block diagram of the system of processing a stone slab in accordance with a non-limiting example.
Figure 2:
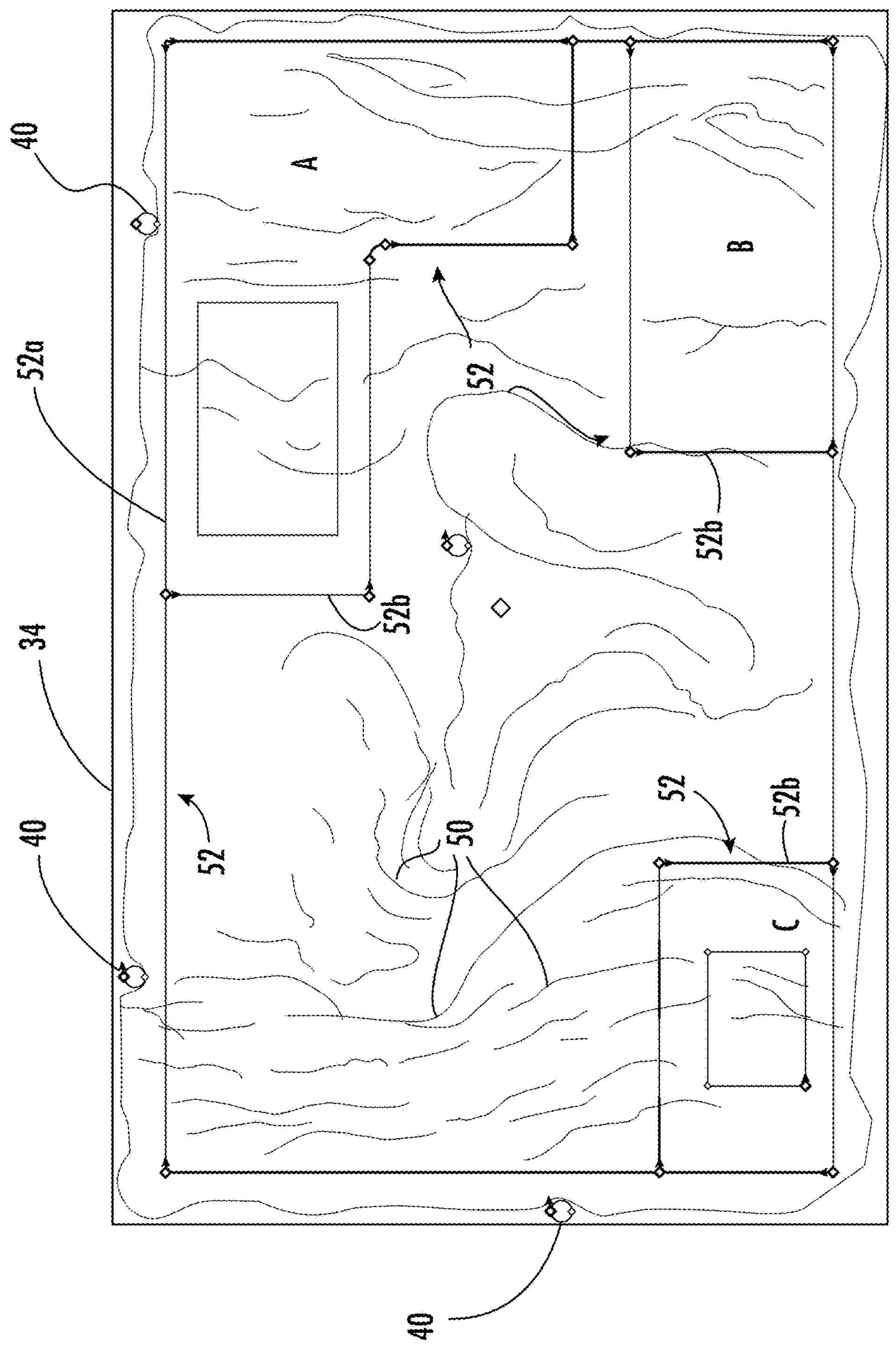
FIG. 2 is a digital image of the stone slab produced from the system of FIG. 1 showing the top polished face and a location of adhered reference markers.

Referring now to FIGS. 1 and 2, there is illustrated generally at 20 a system of processing a stone or a stone-like slab 24 having a top polished face 26 and a bottom surface 28 (FIG. 1). An imaging device 30, such as a display of a computer or other processing device, is configured to receive and display a digital image 34 of the top polished face 26 of the slab 24 as shown for example in the screenshot in FIG. 2. The slab 24 has rough uncut side edges, and in an example, is a quarried slab roughly cut into a substantial rectangular pattern, which is to be cut, and has opposing short sides 36 and opposing long sides 38 in this example.

The slab 24 in this example is about 2.0 to 3.0 centimeters thick, and in another example, about 1.25 to 1.5 inches thick. A plurality of reference markers 40 are adhered on at least one side edge of the slab 24 and shown as the cylindrically shaped markers in FIG. 1 and the circles in the screenshot of FIG. 2.

In the example FIG. 1, at least one long side 38 includes at least two adhered reference markers 40 and at least one short side 36 includes at least one adhered reference marker. Each of the adhered reference markers 40 are the thickness of the slab 24 and each have a top end 40*a* and a bottom end 40*b* (FIG. 1) flush with the respective top polished face 26 and bottom surface 28. Each reference marker 40 may be formed as a cylindrically shaped foam element to allow contraction and expansion back to normal size if the markers are pressed when the slab is moved. The slab digital image 34 may be obtained from a camera 44 connected to a controller 46 or other processor, which takes a photographic image of the slab 24 to be laid out and cut. The reference markers 40 are adhered by a preferred waterproof adhesive to the edge of the slab 24 as illustrated before the camera generates the image in order to obtain a digital image 34 of the top polished face 26 of the slab, together with the reference markers 40 located by the indicated circles. The digital image 34 example of the top polished face 26 of the slab 24 as shown in FIG. 2 shows the locations of the adhered reference markers 40 on the long side 38 and short side 36 based upon the configuration of the rough generally uncut side edges. It should be understood that the system 20 as described for slab alignment may be used even when the slab 20 and side edges 36, 38 are accurately cut straight edges.

As illustrated best in FIG. 2, the stone slab 24 includes a surface appearance as a grain pattern produced by veins 50 that are matched when a slab cut layout 52 is generated, such as by a CAD program using Slabsmith that is based on how the slab will be cut, such as for a countertop, table, floor, or other use. In this example, the outer rectangular line 52*a* represents the outer cut line for producing the large rectangular slab and the other lines 52*b* are for a sink cut out, kitchen tabletop, and other slab components that are matched together and indicted by the designators A, B and C. The slab 24 may be formed from different slab materials including granite, marble, quartz, soapstone, and other quarried materials or engineered stone and hybrid or combinations of synthetic and stone material held together by a resin binder, for example.

The controller 46 receives the digital image 34 of the slab 24 and its top polished face 26 and forwards the digital image data to the imaging device 30 as a display, and via user input on a keyboard, mouse, etc., the controller via software overlays the slab cut layout 52 on the digital image of the top polished face. In this example in FIG. 2 as noted before, the large rectangular outline 52*a* corresponds to the rectangular slab to be cut from the rough cut slab and the other lines 52*b* correspond to the kitchen components such as the sink cutout. Other components can be laid out and cut, but only the three components labeled A, B and C are shown.

Figure 3:
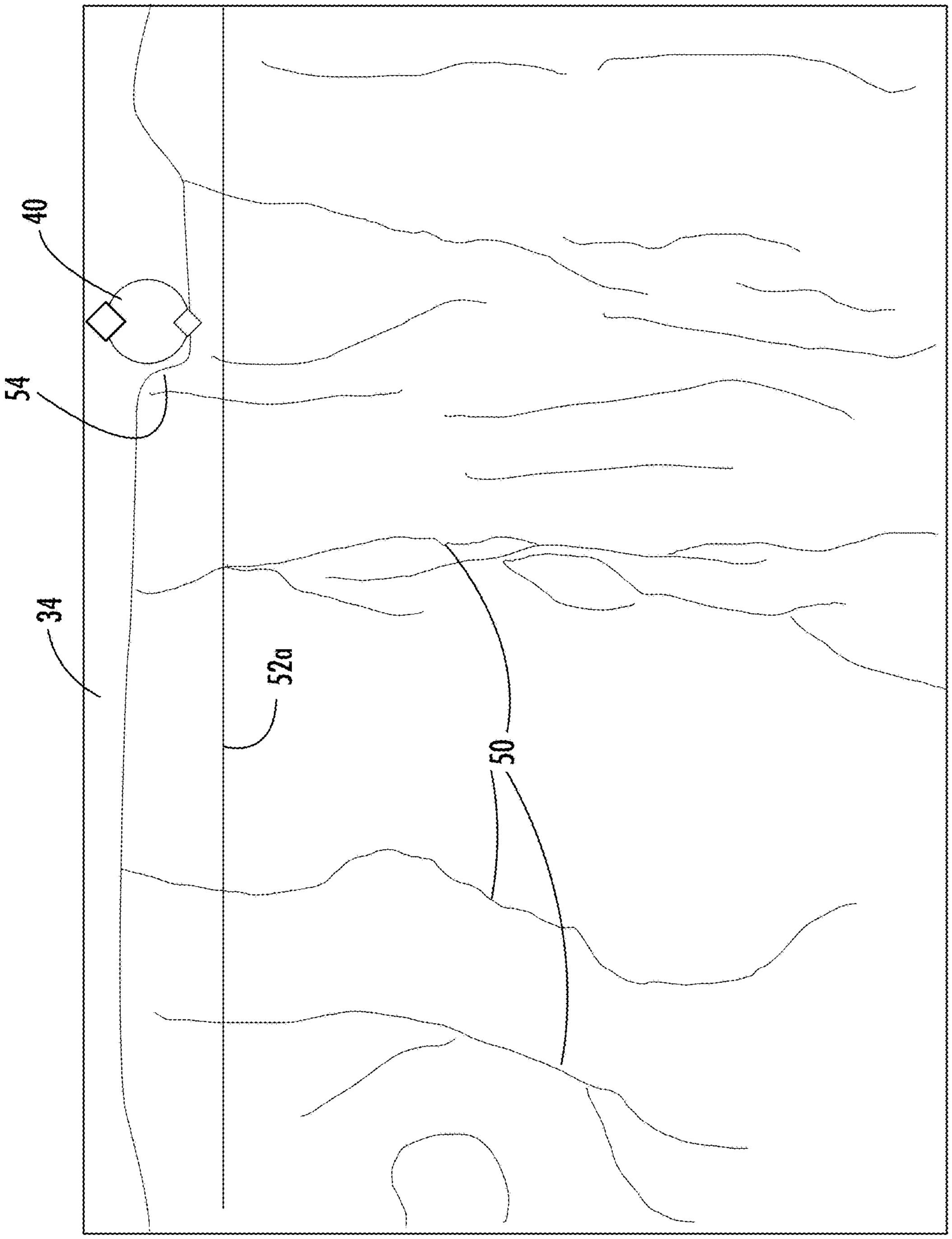
FIG. 3 is an enlarged section of the image of FIG. 2 showing a reference marker location relative to the rough uncut slab edge.

FIG. 3 is an enlarged image of a portion of the slab digital image 34 of FIG. 2 and show a rough crevice 54 on the slab edge and an adhered reference marker 40 depicted by the software as in a circle at that location. The slab cut layout 52 as noted before also includes other lines 52*b* indicative of features that will be cut, such as a sink cutout and other pieces that may be cut from the slab. The controller 46 via its CAD or other software generate a digital slab layout file that contains digital data representative of the top polished face 24 and it slab cut layout 52 referenced to the top end 40*a* of the adhered reference markers 40. The digital slab image file may be a vector file such as a CAD file, and in an example, a Drawing Exchange Format (DXF) file.

Figure 4:
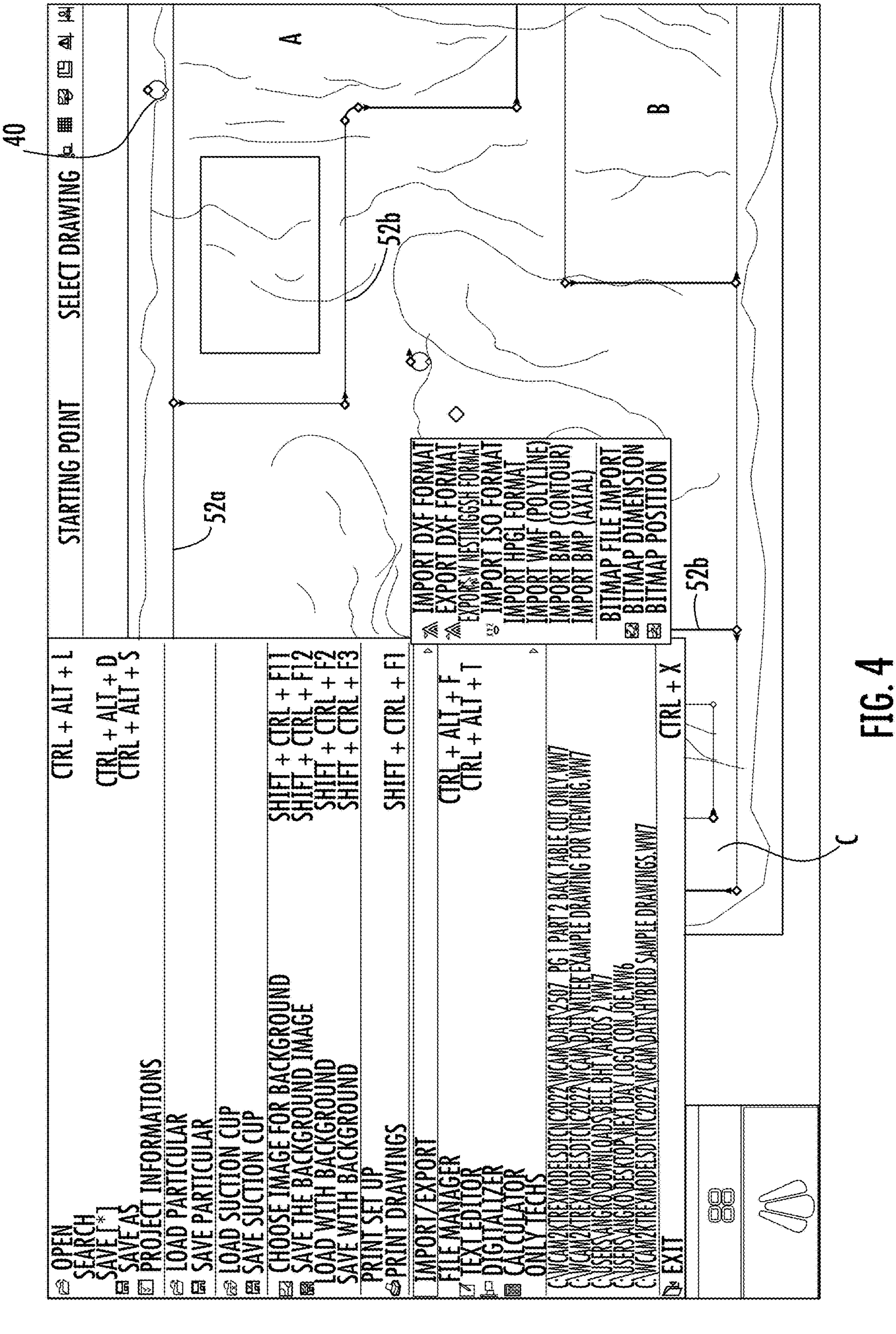
FIG. 4 is a screenshot showing user manipulation by exporting a digital slab image file.
Figure 5:
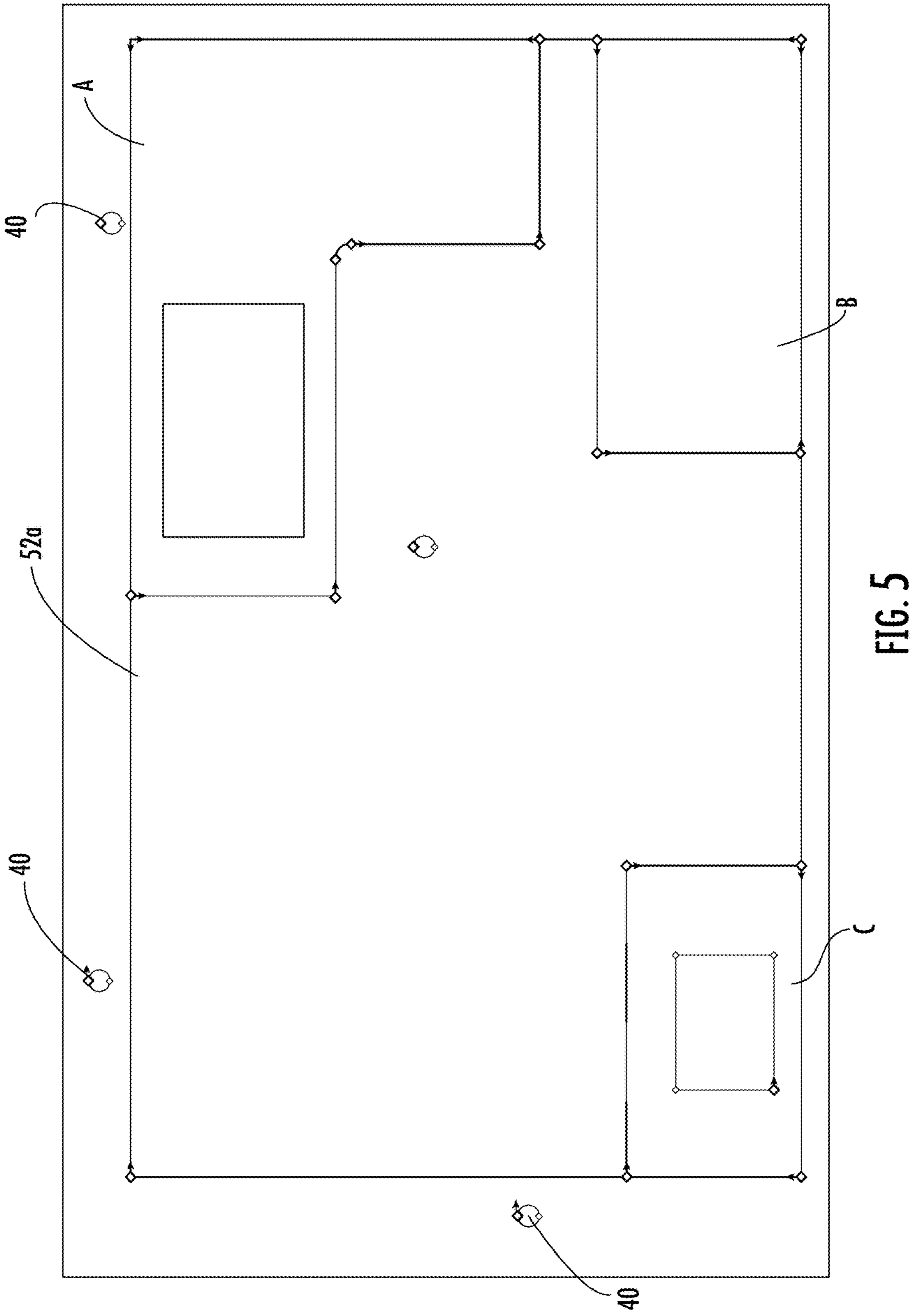
FIG. 5 is a screenshot of the schematic image of the digital slab layout file of FIG. 2.
Figure 6:
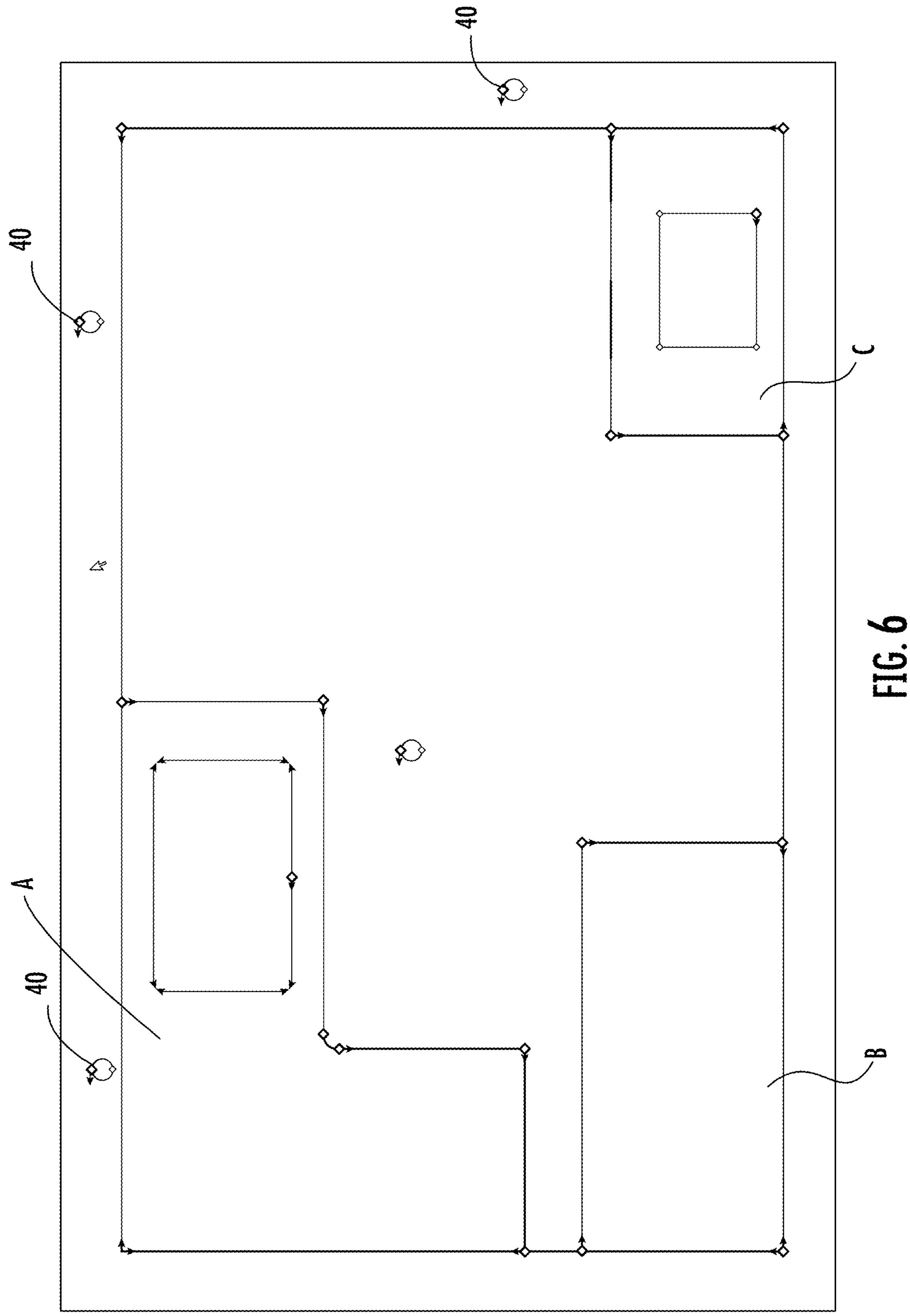
FIG. 6 is a screenshot of the mirror image of the digital slab layout file of FIG. 5.

The reference markers 40 may be traced by the CAD feature of the layout software and show up as a DXF file layout such as shown in FIG. 5. As shown in the screenshot of FIG. 4 illustrating user input of the file, the DXF format may be exported and mirror imaged as shown in the screenshot of FIG. 6 so that the reference markers 40 are positioned in mirror imaged locations corresponding to when the top polished face 26 of the slab 24 is in a reverse or upside down position for cutting with the top polished face down and cutting occurring on the bottom surface 28. The sink cutouts and labeled sections A, B and C are reversed. The controller 46 is connected to a laser projector 60 (FIG. 7) showing the CNC slab processing machine as a cutting/fabrication machine 62. The mirror imaged locations of the reference markers 40 are projected as digital data by the controller to the laser projector 60 where they are projected as green light at the location on the machine 62 where the actual adhered reference markers 40 are to be located by aligning the bottom ends 50*b* of the adhered reference markers with the respective projected reference marker locations when the slab 24 is upside down for cutting in a slab cutting position on the machine 62.

It should be understood that the reference markers 40 formed from the cylindrically shaped foam elements in this example may be any diameter, but typically are the same length as the thickness of the stone slab 24 so either end 40*a*, 40*b* of the foam piece is flush with the respective surfaces 26,28 of the stones slab. At the very least, there should be two reference markers 40 on one of the long sides 38, such as the top long side, and one reference marker on either of the short sides 36. The reference markers 40 as foam elements may be adhered to the side edges by a waterproof adhesive or similar adhesion technique, and are adhered before the photo image of the slab is taken to generate the slab cut layout 52. The reference markers 40 appear in the images as circles and may be traced by the CAD feature of any layout software.

In this example, the reference markers 40 show up on the DXF file layout (FIGS. 5 and 6) produced from the Slabsmith-type software and CAD features. When these files are used for execution on the CNC slab processing machine 62 as a cutting/fabrication machine, the location of the reference markers 40 are mirror imaged and their locations are highlighted and projected via the laser projector 60. Because the slab 24 is upside down with the top polished face 26 down and bottom surface 28 up for cutting, the only visible references for positioning the slab will be the laser indicating the proper location where the bottom surface 40*b* of the cylindrical foam reference marker 40 on the actual physical slab are to be located, and thus, enable exact positioning of the slab for cutting upside down in the proper slab cutting position.

Figure 7:
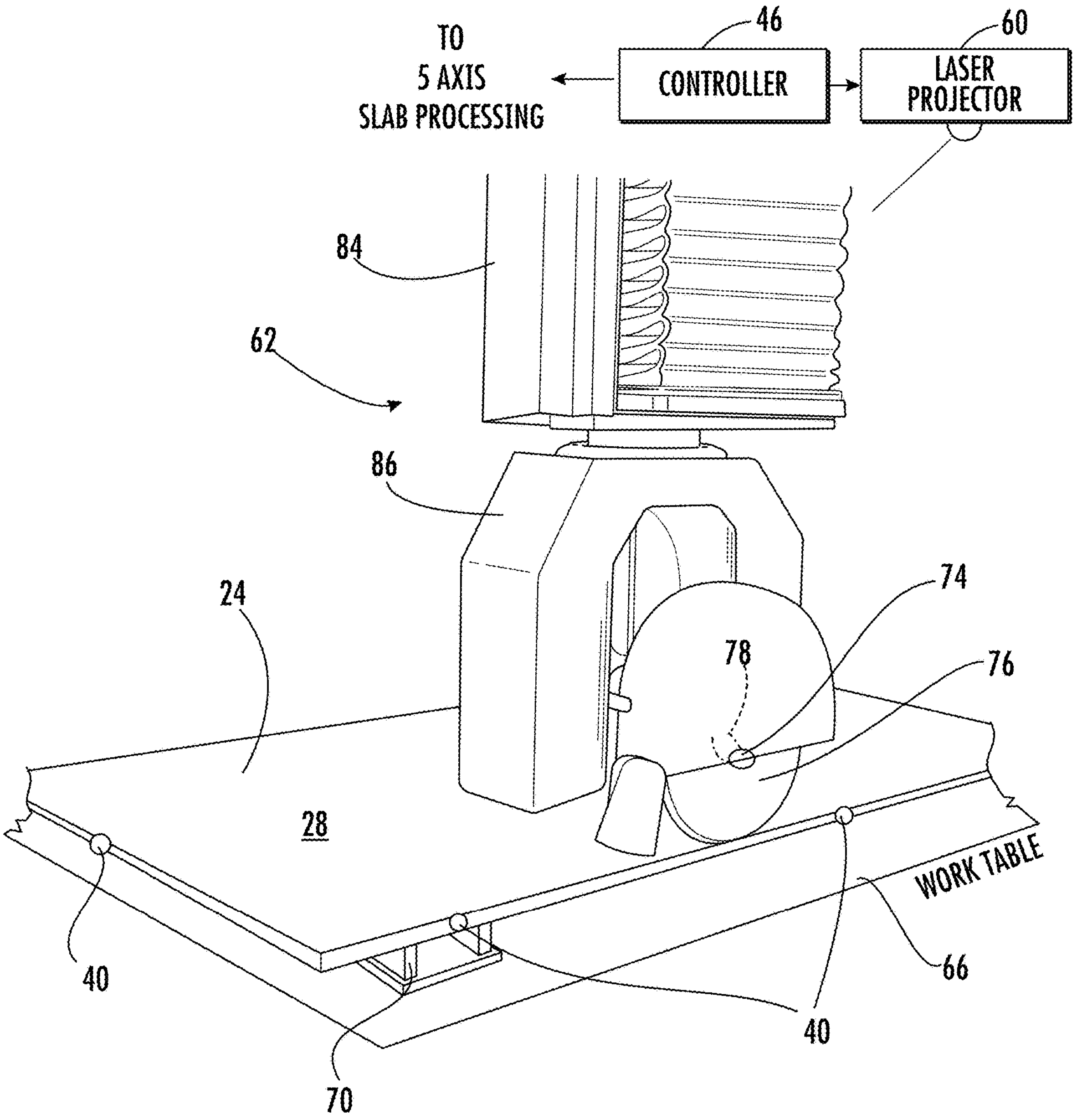
FIG. 7 is an image of a CNC slab processing machine as a cutting/fabrication machine having a stone slab, such as an example from which the image of FIG. 2 was taken, correctly positioned upside down for cutting.
Figure 8:
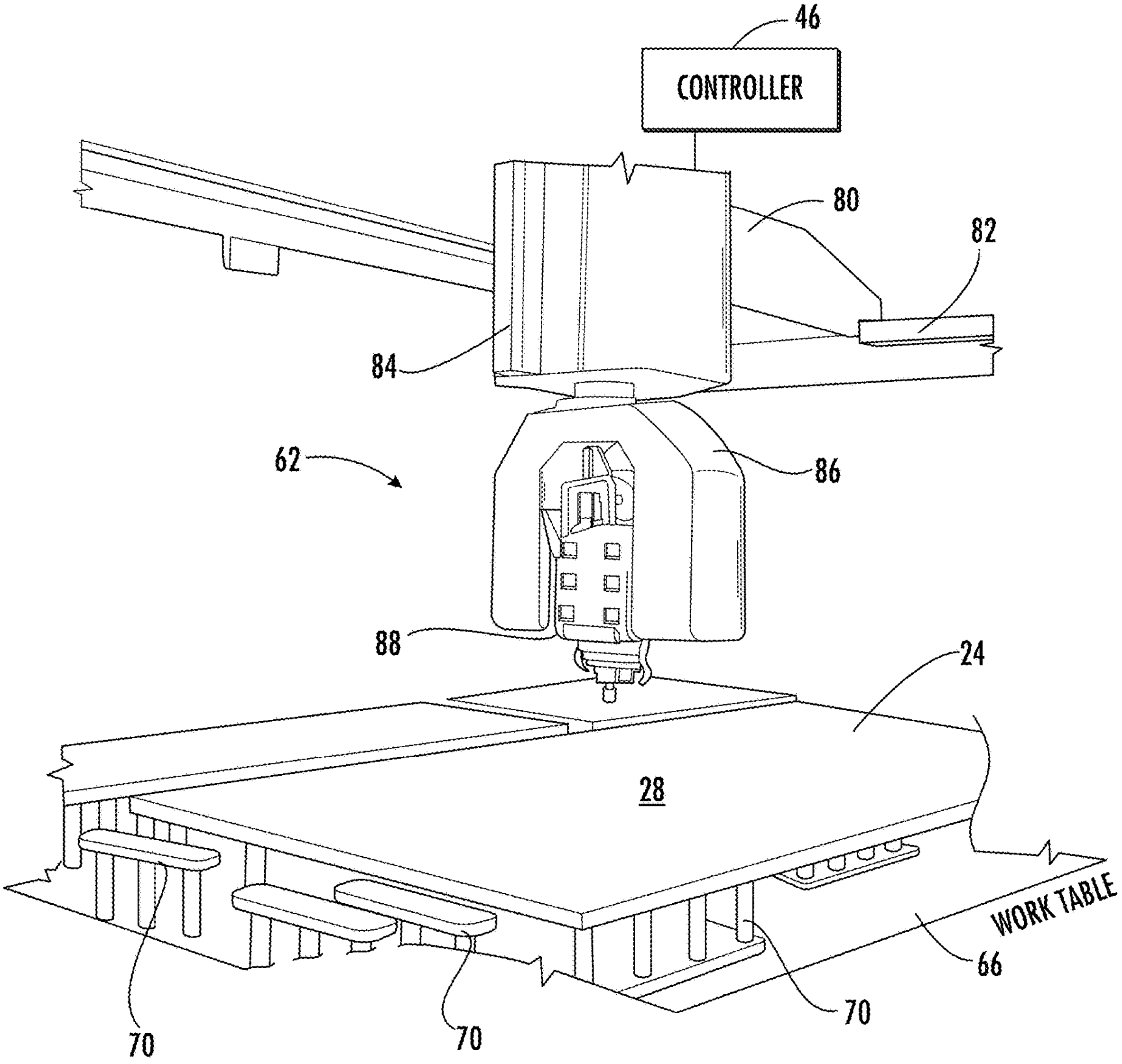
FIG. 8 is another image of the cutting/fabrication machine of FIG. 7 showing the stone slab being cut.

The computer numerical control (CNC) slab processing machine 62 has a work surface 66 as a table on which the slab 24 is positioned upside down with respect to the mirror imaged digital slab layout file. In this example, the work surface 60 as a table supports vacuum pods 70 on which the top polished face 26 of the slab 24 is positioned for upside down cutting. An example of the vacuum pods 70 are shown in FIGS. 7 and 8 where in FIG. 8, a portion of the slab 24 has been cut and removed to form three rectangular pieces. The upside down cutting of the slab 24 occurs on the vacuum pods 70 and exact positioning is required.

The work surface 66 as a table may be formed as a polished or engineered stone slab such as a quartz slab that has been milled to a flat polished surface and a precise dimension on its surface for CNC cutting and fabrication of a stone slab 24. The vacuum pods 70 are positioned on the work surface 66 and the vacuum pods provide a safe holding system for the stone slab and do not require a fabricator to drill into the slab 24 or need to work around the edges of a countertop. In this example, the vacuum pods 70 are rectangular configured and include the vacuum ports and vulcanized rubber fused onto an anodized aluminum surface with a tolerance of +/−0.02 millimeters. The slab 24 may be raised from the work surface 66 as a table in order to cut, route, drill, cut and machine and polish edges. The friction pads on the vacuum pods 70 as noted before may be made from hot volcanized rubber fused onto an anodized aluminum surface to endure the harsh and demanding industrial requirements of stone slab cutting. The heights of the vacuum pods 70 may vary.

The CNC slab processing, cutting/fabrication machine 62 includes a drive motor and spindle 74 (shown covered by the cut shield) and cutting blade 76 mounted on the spindle (FIG. 7). For cutting stone, the cutting blade may be formed from ceramic or similar materials. A coupling cone 78 may be configured to mount the cutting blade 76 to the spindle 74. Tools for cutting, routing, polishing, etc. may be interchanged as the tools may be mounted on different coupling cones.

The CNC slab processing machine 62 may be a slab cutting and fabrication machine, such as a five axis CNC machine sold by Poseidon Industries, Inc. as the T-REX. This CNC fabrication center may operate as a 5 or 4 axis CNC bridge saw. The slab pieces may be moved around with vacuum lifters attached to the spindle unit. It may also operate as a 5 axis CNC profiling machine and sculpting machine. It has an automatic tool changer for profiling tools and saw attachment. It includes a 25 horsepower to 35 horsepower spindle and operates with an 18 inch to 20 inch blade with a blade attachment for a 20 inch blade diameter. It may include a 20 tool magazine and is an available in single and dual table models. In the configuration with a 35 horsepower motor and 20 inch blade, the X-axis is about 160 inches and the Y-axis is about 100 inches. The air may have continuous 125 pounds per square inch at about 10 cubic feet per minute. A capacity water line for clean water is 1 to 2 gallons per minute and a capacity water line ready with recycled water may be 4 to 6 gallons per minute. The machine weight is about 17,000 pounds and uses 400 volts with mutual 80 amp three-phase power.

The CNC processing machine 62 includes a bridge 80 supported on rails 82 to allow X-Y movement and include a vertical cut head support column 84 that supports a U-shaped member having support arms 135 that support a cut head 88 having the motor and spindle 74. The vertical cut head support column 84 permits vertical “Z” movement of the cut head 88 with the cut head moveable in the “A” and “C” axis. The circular cutting blade 76 for initial cutting of the slab 24 in FIG. 7 may be a ceramic blade and supported on the coupling cone 78 and inserted within the spindle 74. The cut head 88 may be rotated 90° along the “A” axis so the circular saw blade is vertically aligned for cutting as shown in FIG. 7.

For cutting a sink, the cut head 88 is rotated back on its “A” axis and the spindle 74 vertically oriented as shown in FIG. 8. A cutting tool such as a finger bit router may be inserted for cutting out a sink hole or cutting the edges of the sink. All cuts and routing and subsequent polishing occur while the slab 24 is positioned on the vacuum pods 70 with the slab in an upside down position.

The laser projector 60 (FIG. 7) not only projects the locations for alignment of the reference markers 40 and the slab 24 for cutting, routing and polishing, but may be used in an example to help guide the cut head 88. The laser projector 60 may be mounted above the work surface 66 as a table and may employ a green light laser that is controlled via the controller 46.

The controller 46 may be a computer system that processes data in accordance with one or more instructions and includes one or more processors and memory such as both RAM and ROM for storing data. The controller 46 may be a personal computer, high end workstation, a mainframe, server, or cloud based system in non-limiting examples. The controller 46 processes digital images using an appropriate CAD program, including for example, Slabsmith, and may process image data and issue commands to the CNC slab processing machine 62.

The controller 46 may include an image data conversion program as software that converts image data such as the CAD DXF file, in an example, into the appropriate control signals for instructing the CNC slab processing machine 62 to move the cut head 88 in the appropriate directions along the five X, Y, Z, A and C axes. It is possible that externally-generated digital image files may be stored in a memory of the controller 46. Other image files may be transmitted to the controller 46 via a local area or wide area network and wired or wireless connections or via other internet routes.

The CAD program may store data in layers and blocks of data that include not only a countertop outline, but an outline for a sink opening, faucet cut-outs, sink holes, and other structures and features in a countertop. In order to ensure proper positioning and cutting, the CNC processing machine 62 includes the smooth work surface on which the slab 24 is positioned upside down, such as an accurately milled, engineered, and polished quartz or other surface. Similar processing used for the slab 24 may be used to produce the flat polished surface of the work surface 66.

Images of different slabs 24, including the top polished faces 26 with different aesthetic vein characteristics of different slabs may be stored within a database associated with the controller 46. Different slab cut layout files 52 may be stored, several for an individual slab 24. The digital image 34 of the top polished face 26 of the slab 24 may include dimensional and material details about the stone slab and data related to its storage, including a unique identifier, the date/time it was stored, the dimensional relationships, including the thickness, length and width as a rough cut slab, color characteristics, possible purchaser information, and other customer and commercial data related to the slab.

The camera 44 used to take the digital image of the slab 24, including the top polished face 26 of the slab and adhered reference markers 40, may be incorporated into a manufacturing line and may even be taken when the slab is positioned off-table from the CNC slab processing machine 62. The camera 44 may be a visible light camera, infrared camera, 3D scanning device, time-of-flight camera, structured light scanner, or stereoscopic scanner. The camera may make 2D and 3D images.

The imaging device 30 as a display may include a user interface menu that allows user selection via a mouse or other input device, including a keyboard, to toggle between different viewing angles or vantage points and input data related to the slab and cut layouts. The stone slab 24 may be a molded stone slab or formed from particulate mineral material that may be mixed with pigments and a resin binder and compressed to form a hardened slab. The stone slab may be cut to specific shapes, such as shown in the cut pieces in FIG. 8, for a countertop, table, floor, or similar end uses. The aesthetic effect of the top polished face 26 includes the veins that may extend the complete length of the stone slab and through all or part of the thickness of a stones slab, and provide the natural vein appearance even when the slab is cut and edged to specific shapes.

The initial digital image of the slab 24, such as its top polished face 26, will show the perceptible characteristics and veins (FIG. 2). Different unique identifiers for a stone slab may include a label, bar code, RFID tag, QR code, or etching and writing directly on the stone slab an identifier. The digital image 34 of the stone slab 24 may have a predetermined dimensional relationship and the ratio of stone slab unit lengths per image pixel may extend less than 0.001 inch per pixel up to 0.02 inch per pixel. This small pixel ratio may allow a distortion free image to be shown. Thus, the digital image 34 of the top polished face 26 provides a reliable image and tool to overlay a slab cut layout 52 on the digital image and provide a known relationship that facilitates a high degree of precision for slab visualization when generating the slab cut layout.

Figure 9:
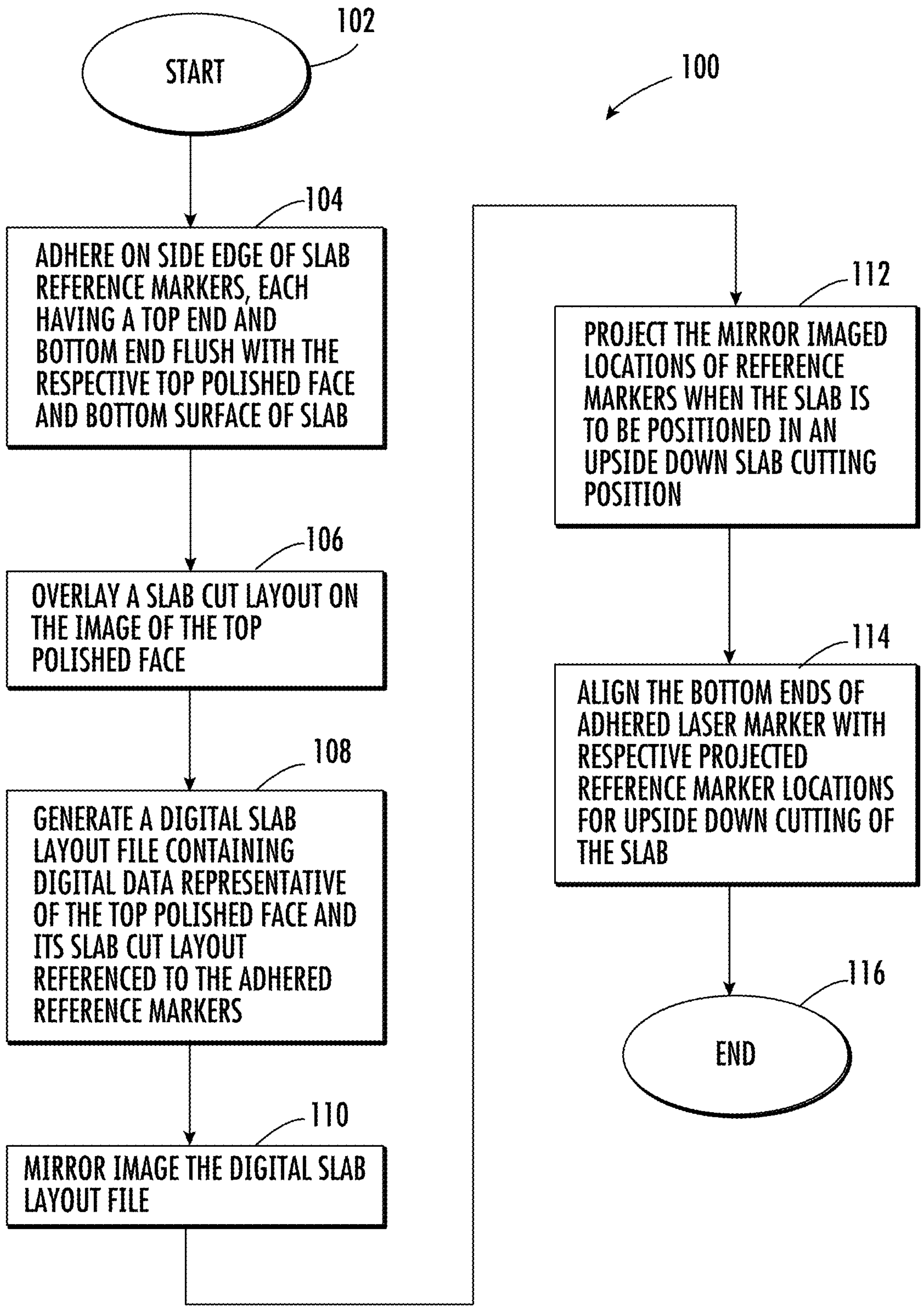
FIG. 9 is a high-level flow diagram of the stone slab processing with the system of FIG. 1.

Referring now to FIG. 9, there is illustrated a high-level flowchart showing a method of processing a stone or a stone-like slab 24 having side edges and a top polished face 26 and bottom surface 28 and illustrated generally at 100. The process starts (Block 102) and a plurality of reference markers 40 are adhered on at least one side edge of the slab (Block 104). Each of the plurality of adhered reference markers 40 is the thickness of the slab 24 and has a top end 40*a* and a bottom end 40*b* flush with the respective top polished face 26 and bottom surface 28. A slab cut layout 52 is overlaid on the top polished face 26 corresponding to the digital image (Block 106) such as by a CAD program. A digital slab layout file is generated and contains digital data representative of the top polished face 26 with adhered reference markers 40 and its slab cut layout 52 referenced to the adhered reference markers (Block 108). The digital slab layout file is mirror imaged (Block 110). The mirror imaged locations of the reference markers 40 are projected when the slab 24 is to be positioned in an upside down slab cutting position (Block 112). The bottom ends of the adhered laser markers 40 are aligned with the respective projected reference marker locations for upside down cutting of the slab (Block 114). The process ends (Block 116).

Referring now to FIGS. 10-16, there are illustrated views showing the system 20 of processing the stone or stone-like slab 24 having the top polished or finished face 26 and bottom surface 28 using a different type of reference marker indicated generally at 41 as compared to the reference markers 40 adhered on at least one side edge of the slab as shown in FIG. 1. An imaging device 30 is configured to receive and display a digital image 34 of the top polished face 26 of the slab 24.

Figure 10:
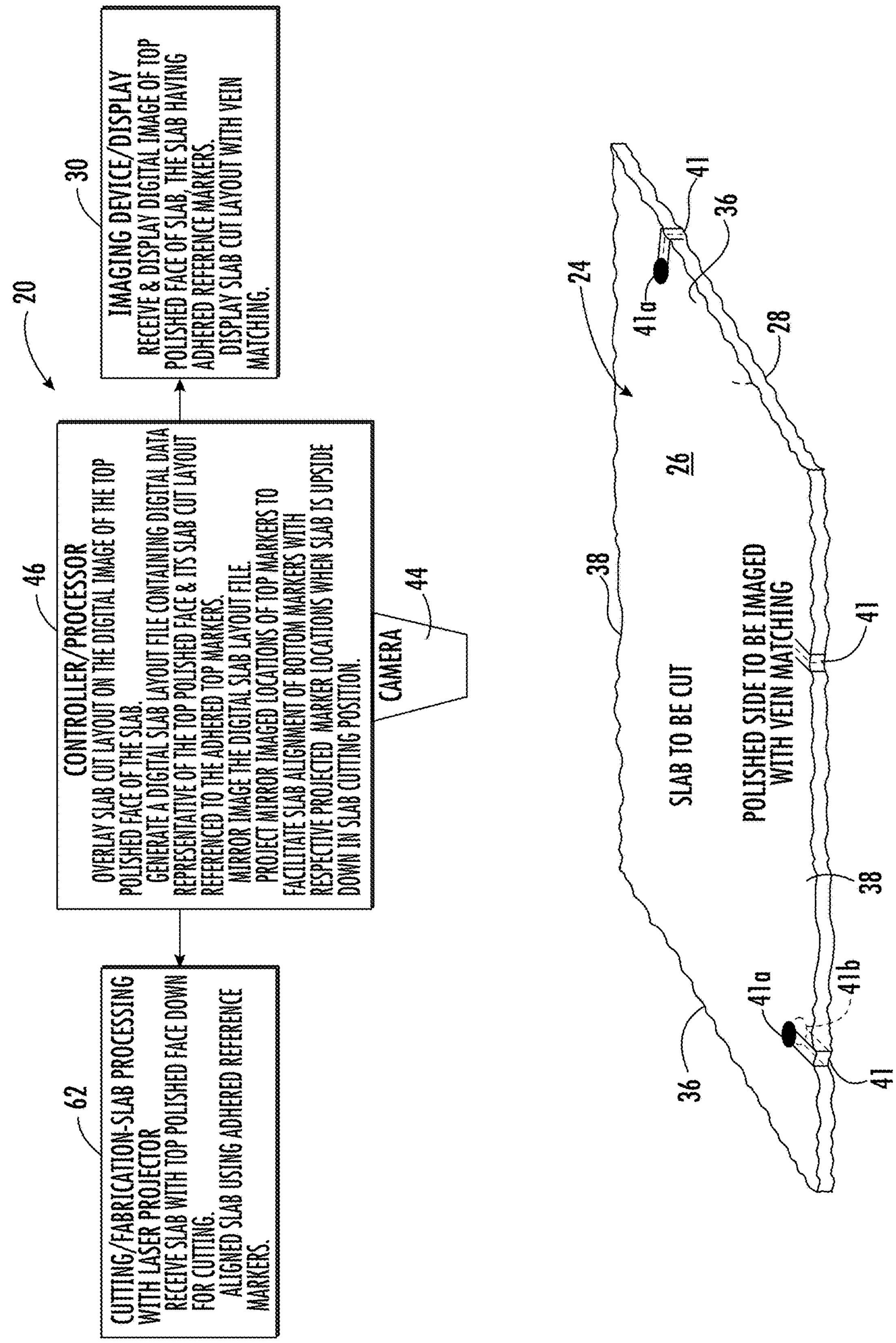
FIG. 10 is a schematic block diagram of the system of processing a stone slab similar to that of FIG. 1, but showing reference markers that are adhered around the side of the slab and include a top marker on the top polished face and bottom marker on the bottom surface.
Figure 11:
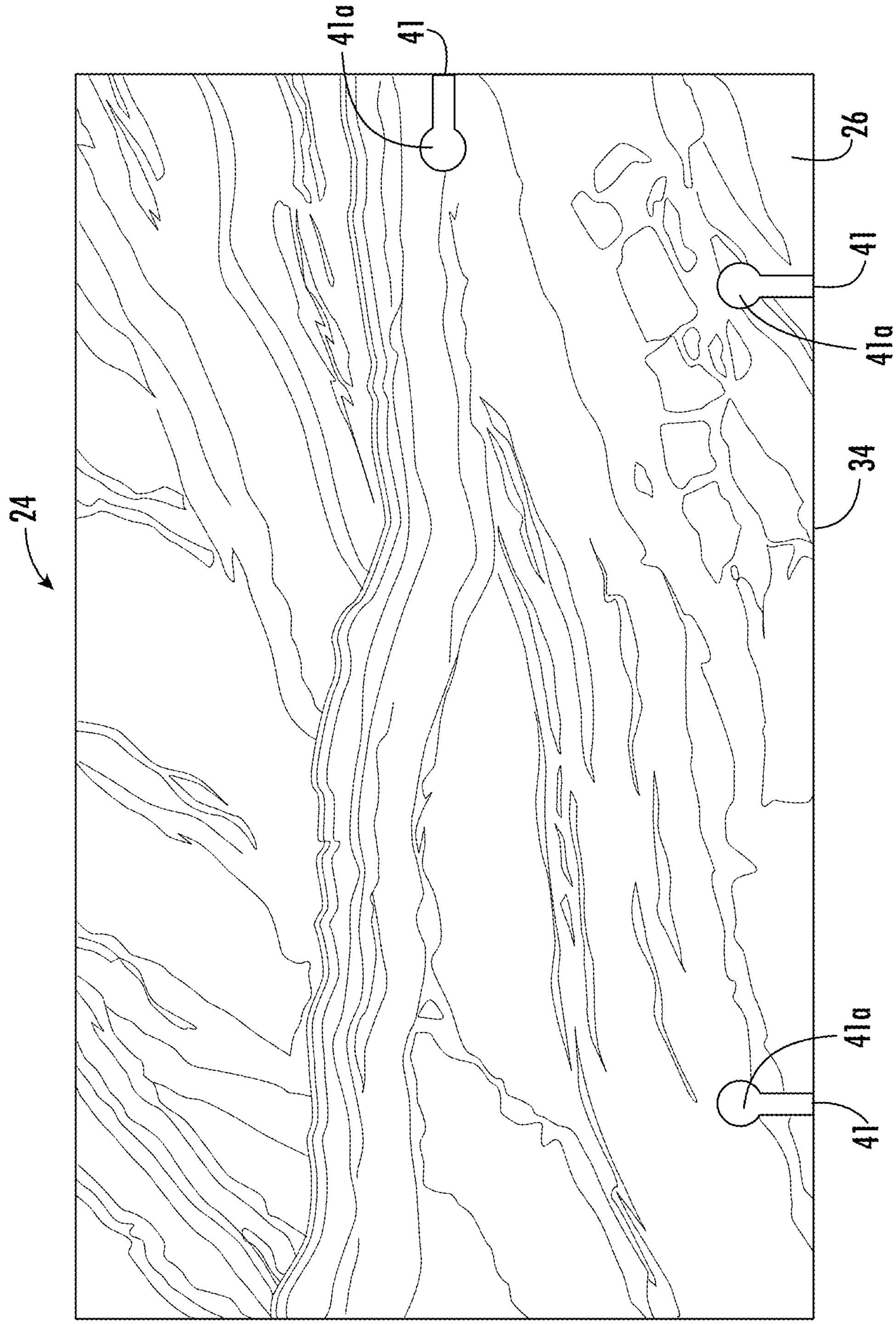
FIG. 11 is an image of the top polished face of a slab showing top markers.
Figure 12:
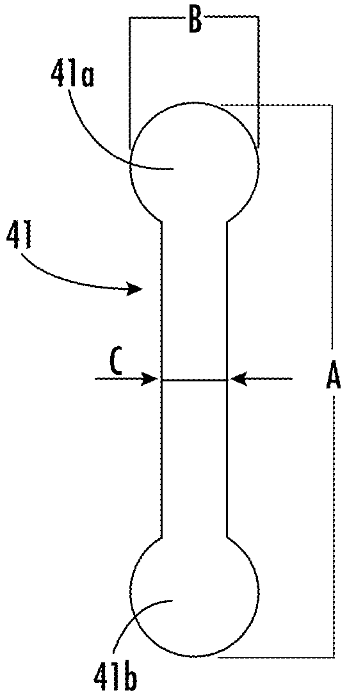
FIG. 12 is a plan view of a reference marker showing enlarged circular portions at the opposing ends forming the respective top and bottom markers.
Figure 13:
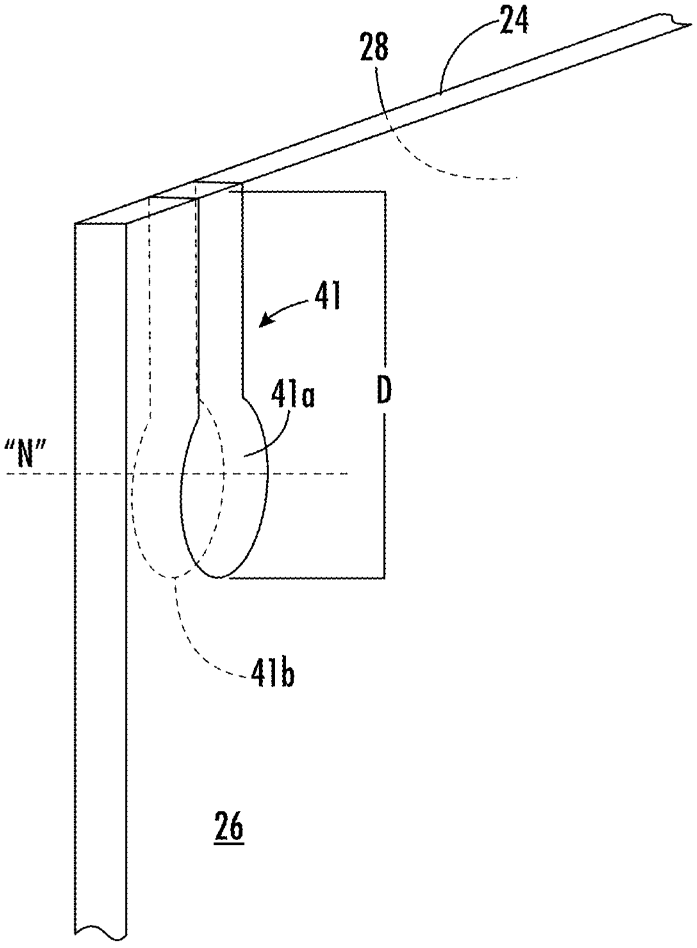
FIG. 13 is a partial, fragmentary view of a slab having an adhered reference marker.

The slab 24 has a plurality of adhered reference markers 41 as shown by the three reference markers applied onto the slab in FIG. 10. Each reference marker 41 is formed as a top marker 41*a* and adhered onto the top polished face 26 and bottom marker 41*b* and adhered onto the bottom surface 28. The top marker 41*a* and bottom marker 41*b* are aligned with each other in a line normal to the top polished face 26 and bottom surface 28 as shown in FIG. 13. Each reference marker is formed as an adhesive strip having opposing ends corresponding to top and bottom markers 41*a*, 41*b* that are aligned when the strip is positioned around a side of the slab as shown in FIGS. 12 and 13. Each opposing end is formed as an enlarged circular portion forming the respective top and bottom marker 41*a*, 41*b*.

As shown in FIG. 13, when the reference marker 41 is applied around the side of the slab, the top and bottom markers 41*a*, 41*b* are aligned with each other in a line normal (N) to the top polished face 26 and bottom surface 28. In an example shown in FIG. 11, a 9'7" by 5'7" slab 24 as a non-limiting example has three reference markers applied, with two on the long side and one on the short side. In an example (FIG. 12), the reference marker 41 as an adhesive strip is about 17¼ inches long (dimension "A") with the enlarged circular portion forming the respective top and bottom marker 41*a*, 41*b* having a diameter (dimension "B") of about 4 inches. The more narrow longitudinal strip segment between the circular configured ends forming the medial portion is about 2 inches wide (dimension "C"). When applied onto a 1¼ inch thick slab as shown in FIG. 13, the length from the end of the circular portion to the edge of the slab 24 is about 8 inches (dimension "D").

The reference marker 41 may be an adhesive strip having different dimensions, as long as the top and bottom markers 41*a*, 41*b* can be referenced to each other, such as in a line normal to the top polished face 26 and bottom surface 28. For example, the controller 46 connected to the imaging device 30 may overlay a slab cut layout 52 on the digital image 34 of the top polished face 26, such as shown by the digital image of the slab 24 in FIG. 11. The controller 46 generates the digital slab layout file therefrom containing digital data representative of the top polished face 26 and its slab cut layout that is referenced to the top markers 41*a*. The controller 46 will mirror image the digital slab layout file 52 and project the mirror imaged locations of the top markers 41*a* to facilitate alignment of the bottom markers 41*b* with the respective projected marker locations when the slab 24 is positioned upside down with the polished face down for cutting in a slab cutting position.

Similar to the configuration described relative to FIGS. 1-9, the laser projector 60 may be configured to project the mirror imaged locations of the top markers 41*a*. The digital slab cut layout file may comprise a vector file, and in an example, a DXF file that is generated and contains the digital data representative of the top polished face 41*a* and its slab cut layout 52 referenced to the top markers 41*a*.

The system 20 may incorporate a computer numerical control (CNC) slab processing (or fabrication) machine 62 having a work surface as a work table 66 on which the slab 24 is positioned upside down with respect to the mirror imaged digital slab layout file. The CNC slab processing machine 62 may include the drive motor and spindle 74 and cutting blade 76 mounted on the spindle. Vacuum pods 70 may support the top polished face 26 of the slab 24 during upside down cutting and further processing such as routing, milling, and polishing.

Figure 14:
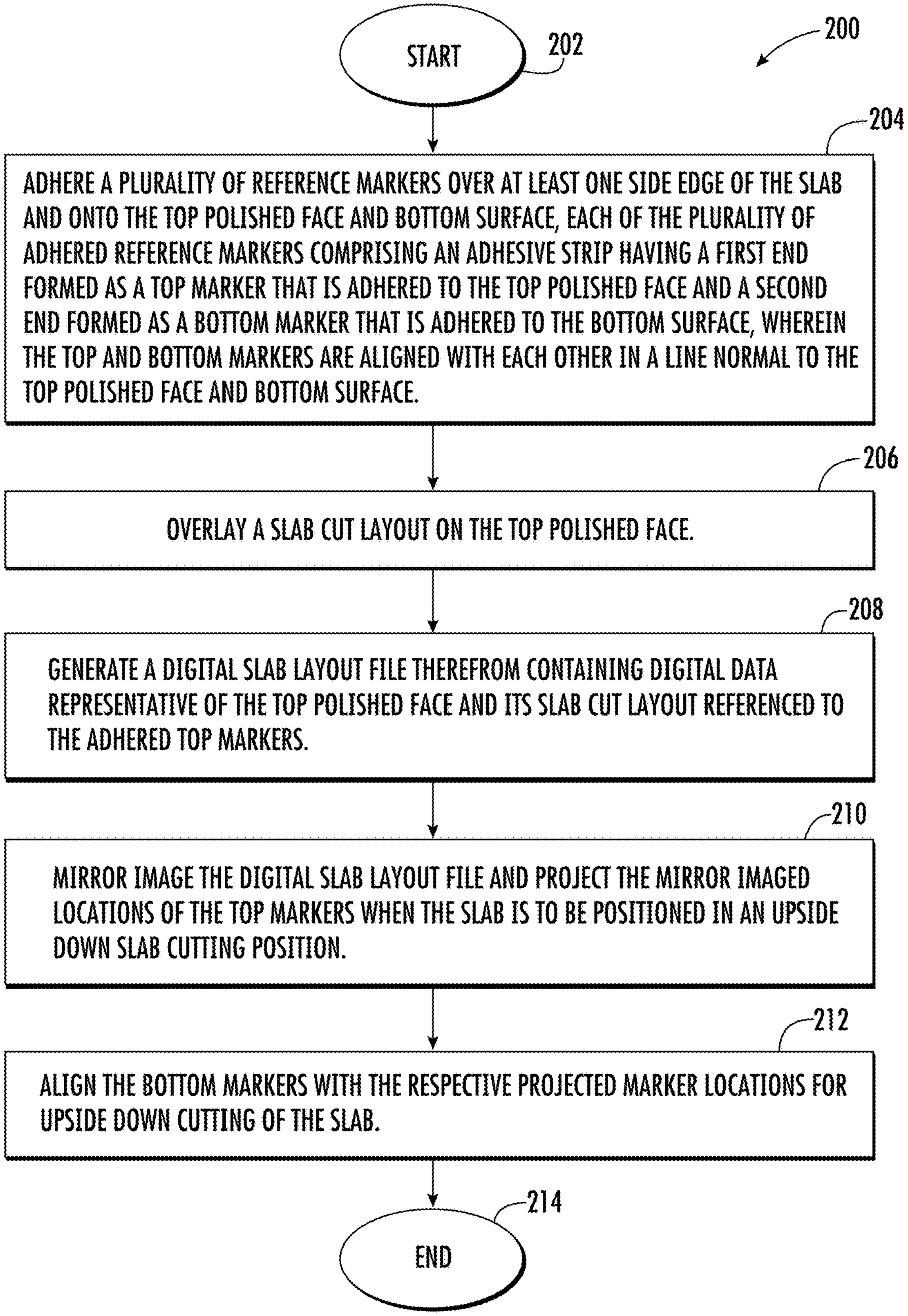
FIG. 14 is a high-level flow diagram of the stone slab processing with the system of FIG. 10.

A method of processing the stone or stone-like slab 24 having side edges and a top polished face 26 and bottom surface 28 is shown generally at 200 in FIG. 14. The process starts (Block 202) and a plurality of reference markers 41 are adhered over at least one side edge of the slab 24 and onto the top polished face 26 and bottom surface 28. Each of the plurality of adhered reference markers 41 include an adhesive strip having a medial portion with a first end formed as the top marker 41*a* that is adhered to the top polished face 26 and a second end formed as the bottom marker 41*b* that is adhered to the bottom surface 28. The top and bottom markers 41*a*, 41*b* are aligned with each other in a line normal "N" (FIG. 13) to the top polished face 26 and bottom surface 28 (Block 204).

A slab cut layout 52 is overlaid on the top polished face 26 (Block 206). A digital slab layout file is generated therefrom containing digital data representative of the top polished face 26 and its slab cut layout 52 that is referenced to the adhered top markers 41*a* (Block 208). The digital slab layout file is mirror imaged and the mirror imaged locations of the top markers 41*a* projected when the slab is to be positioned in an upside down slab cutting position (Block 210). The bottom markers 41*b* are aligned with the respective projected marker locations for upside down cutting of the slab (Block 212). The process ends (Block 214).

Further details of CNC slab processing or fabrication machine 62 are now described to understand better the advantages of the use of reference markers 40,41 and upside down cutting.

Figure 15:
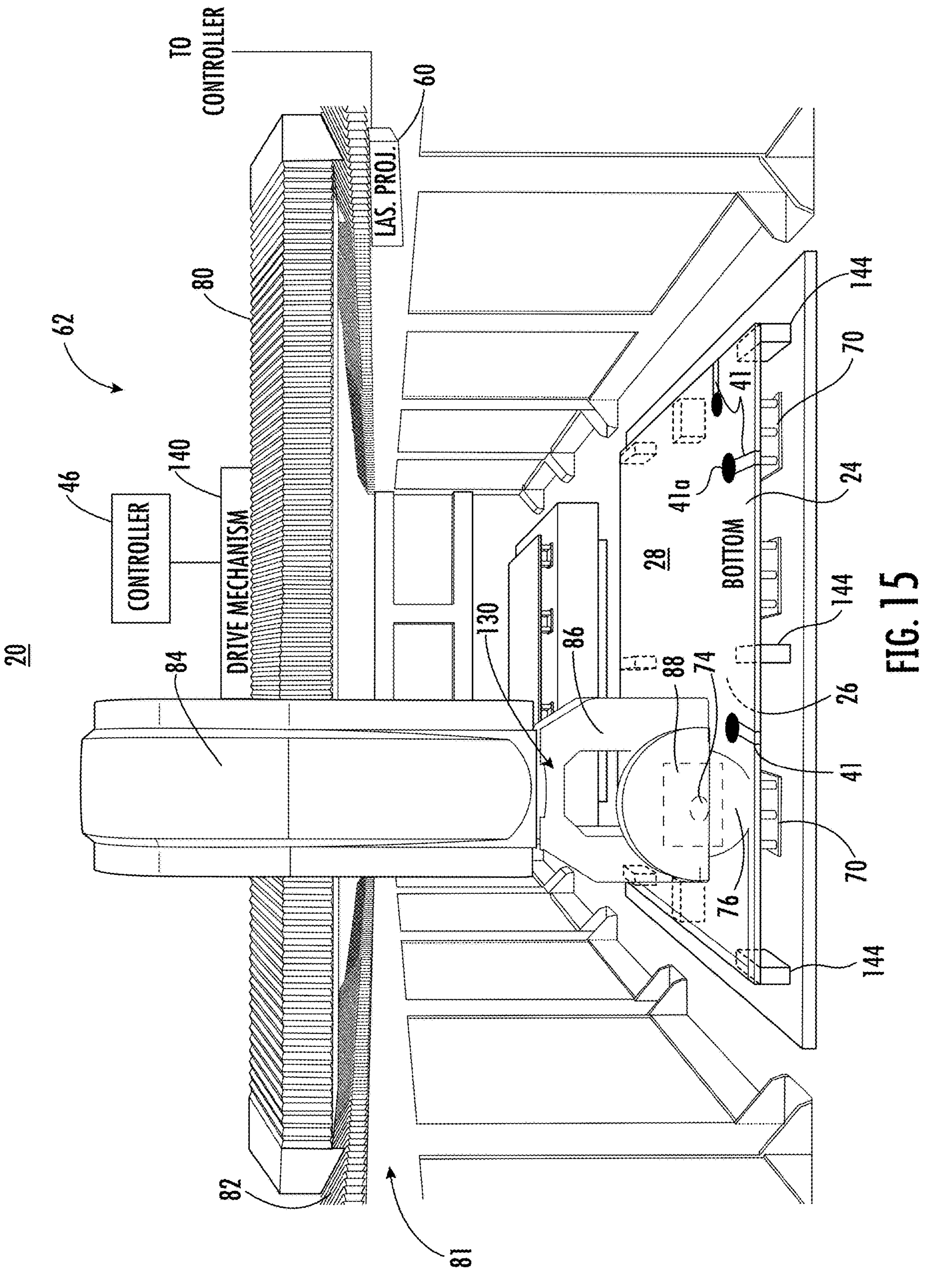
FIG. 15 is a schematic, isometric view of the machine showing the machining head having a circular saw blade to cut a slab using a mirror imaged slab cut layout that has been aligned for upside down cutting.

As shown in FIG. 15, the slab processing machine 62 may include a dual work table 66 as a 5-axis machining center. The machine 62 allows Phase 1 cutting to be completed when a slab 24 is positioned upside down with the top finished or polished face 26 down. The laser projector 60 may project the laser optical beam towards the work table 66 and position the slab 24 upside down on the work table as explained above. The upside down cutting allows tighter nesting because overcuts are shorter due to a deeper plunge of a circular saw blade 76 when cutting. There is also reduced work table 66 maintenance because the circular saw blade 76 cuts through the slab 24 in the air, where the slab is raised from the work table because the slab is positioned on vacuum pods 70.

Because the machine 62 is performing upside down slab cutting, it is possible to go straight into Phases 2 and 3 for the fabrication as preparation and finishing of the slab 24 right after slab cutting and perform these slab processing phases on the same work table 66, while the slab is still upside down with little or no movement of any slab pieces. This process may also be referred to as the "hybrid cycle." A sink hole 127 (FIG. 16) may be cut with a finger bit 129 when a circular saw blade 76 is not used. The sink hole 127 corresponds to the location where a sink may be installed in a finished countertop. A single operator may operate the machine 62 and go straight to fabrication at Phases 2 and 3 after the slab 20 has been cut upside down.

With the machine 62, the slab 21 may be processed and extend along an X and Y coordinate axis on the work table 66 in a slab processing area where the work table 66 is located. Because the slab 24 is upside down, the slab is initially oriented on the vacuum pods 70 using the mirror image slab cut layout that is based upon the slab cut layout 52 initially determined on the top finished face 26 of the slab.

The bridge 80 may be mounted for movement on a machine frame 81 across the slab processing area having the work tables 66 and may support the machining or cut head 88. A carriage 84 is formed as a vertical column or vertical cut head support column and supports the machining head 88, e.g., cut head. The carriage 84 may be mounted on the bridge 80 and configured for vertical movement along a Z-coordinate axis and horizontal movement on the bridge 80 to define movement of the lower end of the carriage 84 that supports the machining head 88 along the X, Y and Z coordinate axes.

Figure 16:
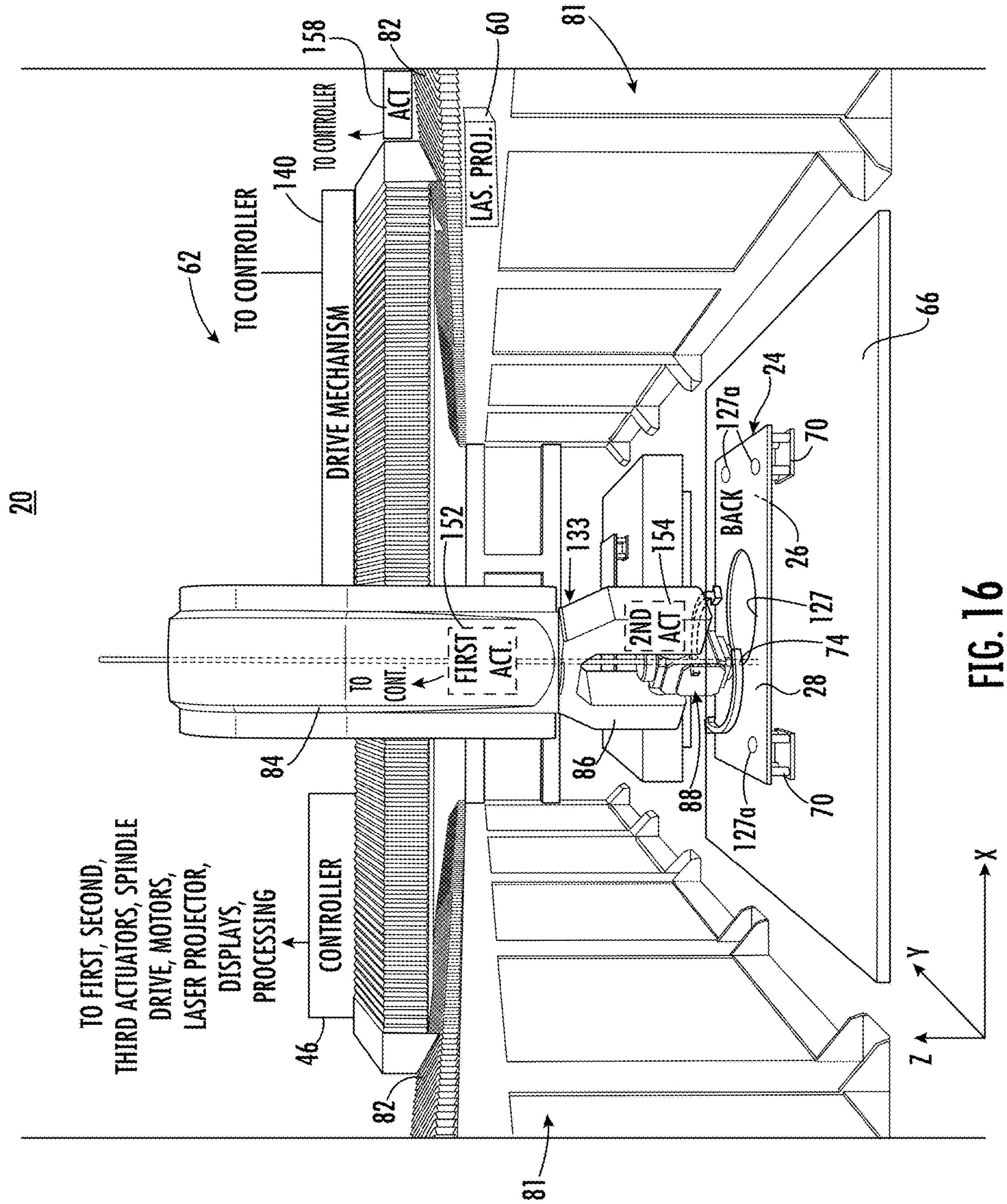
FIG. 16 is a schematic, isometric view of the machine that has switched to a finger bit received in the machining head.

The machine yoke 130 as best shown in FIG. 16 is rotatably mounted at the lower end of the carriage 84 and configured for C-axis rotation. The machine yoke 130 includes opposing support arms 135. The machining head 88 is rotatably mounted between the support arms 135 and configured for A-axis rotation. The machining head 88 includes the drive motor and spindle 74 configured to receive a coupling or mounting cone 78 or similar tool receiver onto which the cutting or circular saw blade 76 is secured for respective cutting on the slab 24 when the slab is positioned upside down on the vacuum pods 70. Different mounting cones may support different circular saw blades, finger bits, edging tools, and other finishing tools so that the different mounting cones with different tools may be interchanged into and out from the spindle.

At least one drive mechanism 140 is connected to the controller 46 and bridge 80, carriage 84, machine yoke 133, and machining head 88 to operate and drive the 5-axis CNC slab processing machine 62. The drive mechanism 140, depending on configuration, may be closed or open loop and may include different actuators, electric motors, stepper or servomotors, or other drive mechanisms for driving separate components, such as the bridge 80, carriage 84, machine yoke 133, machining head 88, and a drive motor/spindle 74. Different position sensors, if applicable, may be incorporated depending on configuration.

The controller 46 is connected to the at least one drive mechanism 140 and configured to control the movement of the bridge 80, carriage 84, machine yoke 133, and machining head 88 and other controller driven components to cut the side edges of the slab 24 or internal sections of the slab while upside down and positioned on the vacuum pods 70 by following a mirror imaged slab cut layout to form a substantially finished slab, which in an example, may be the configuration of a countertop.

Relief supports 144 may be positioned on the work table 66 under the rough cut side edges of the slab 24 to support outside edge trim relief strips during some cutting examples and prevent damage to the exterior side of the substantially finished slab after cutting. In an example, the relief supports 144 may be formed from foam blocks inserted under the side edges of the slab 24 and the foam blocks may be configured to permit the circular saw blade 76 to cut therethrough without impacting saw blade operation. Vacuum clamps could also be used.

A finger bit 129 (FIG. 16) may be supported on a mounting cone inserted within the spindle 74 after the removal of the circular saw blade 76. The routing path may be based upon the mirror imaged slab cut layout. The finger bit 129 may be switched out automatically after a sink hole 127 is cut and replaced with at least one finishing tool.

In an example, the machining head 88 may be rotatably mounted 90° between the support arms 135 along an A-axis so that the spindle 74 is horizontally oriented to mount the circular saw blade 76 for respective cutting of the slab 24. In another example, the machining head 88 is rotated 90° to orient the spindle 74 vertically along the vertical or Z-axis and may mount a finger bit 129, such as a router bit, for routing a sink hole 127 or performing similar cutting of the slab 24. Different actuators, such as a first actuator 152 carried by the carriage 84 within a housing, may be connected to the machine yoke 133 and configured to rotate the machine yoke about the C-axis when processing the slab 24, including routing, cutting, or performing any finishing operations on the slab.

The controller 46 may be connected to the motor and spindle 74 and the first actuator 152 and configured to drive the first actuator and rotate the machine yoke 133 and maintain a support arm 135 leading along the path with advancement of the router or finger bit to relieve stress on A-axis when routing or cutting on the slab. At least one shaft may be supported by at least one of the support arms 135 and axial with the A-axis. The shaft may operate as a support to the machining head 88 and aid in allowing A-axis rotation either by rotating itself or allowing the machining head to rotate thereon. A second actuator 154 may be configured to rotate the machining head 88 along the A-axis at different angles for routing and cutting angles, including 90° as noted before.

The motor for the spindle 74 may include an electric drive with an appropriate drive mechanism configured to rotate the spindle at high speeds for circular saw blade cutting, routing and any finishing operations. A third actuator 158 shown as the motor may be supported by the machine frame 81 and connected to the bridge 80, and controller 46 and drives the bridge during circular saw blade cutting, routing or cutting on the slab and finishing with the finishing tool. It is possible to form the sink anchor holes **127*a* in the slab 24 when positioned on the vacuum pods 70 before or after sink hole routing. They may be configured to receive sink anchors for final mounting of the slab 24** in a residential business.

The laser projector 60 may be mounted above the work table 66 and may employ a green or red light laser and be controlled in operation by the controller 46. In an example, the laser projector 60 is mounted on a ceiling mount, such as a ceiling support, and may be over a central part of the machine 62, such as located between the dual first and second work tables 66.

The laser projector 60 may include thermal temperature management for temperature stability and include fiber-coupled lasers with a red and/or green laser source having an output power that varies and may range up to 14 milliwatts and a conventional output power of about 7 milliwatts. It may have a focus range from about 0.5 meters to 7.0 meters and a working distance using a tele-optic up to about 14 meters. The green light laser, which is preferred, has greater variability than the red light laser. The fan angle, in an example, may range from 80° by 80° and with tele-optic in an example of about 60° by 60°. Accuracy may be about 0.25 millimeters per meter with the focus range from about 0.5 meters up to about 7.0 meters as a standard focus, and in an example, about up to 14 meters in some examples.

Operating voltages may vary, and in an example, may be about 24 volts DC. The laser projector 60 may include different interfaces. The laser projector 60 provides for quick and accurate alignment of a slab 24 and the laser projector may show the cut edges of a slab on the basis of complex construction files on the original scale with slabs optimally aligned on the vacuum pods or other holding mechanism and work table 66 using slab contours. An example laser projector 60 is a laser projection system produced by SL Laser of Traunreut, Germany, that operates as optical laser guided systems used on the CNC machine 62. Examples include the Pro Director 7 or Pro Director 7 LR.

The green light laser beam is clearly visible on the work table 66 and/or workpiece as the slab 24. The time-consuming work associated with using templates may be replaced. Data from a first CAD drawing may be forwarded to the laser projector 60, which then projects the contour onto the stone slab. Another drawing with the corresponding contour may be added. By using the mouse and software program, these two or more contours may be rotated and moved in relation to each other on a display screen of a control console so that the ideal division is achieved.

It is possible to use a router pilot software with an appropriate menu for routing application, which may include different file types. The laser projector 60 may be used to place a virtual inventory of different vacuum pods 70, fixtures, and objects that may be moved, flipped, mirrored, and rotated for marking layouts on the stone slab. In another example, the laser projector 60 may have a +/−0.014 inch or about 0.35 millimeter position accuracy at a distance of over 15 feet, over a 17 foot by 17 foot area with a 60° projection. The field of view may be horizontal at a maximum 80° and vertical at a maximum 70°. The laser is a green light laser of about 520 to 525 nanometers and may incorporate and FC-laser module and use a laser class of 5 milliwatts.

The surface of the first and second work tables 66 may be constructed using 1¼ inch to about 1½ inch thick quartz slabs on table bases. First and second work tables 66 may be leveled within thousandths of an inch. These level first and second work tables 66 facilitate programming and there is one origin for both work tables, thus requiring only one calibration of the two work tables 66, and not two separate calibrations. It is possible the laser projector 60 may be mounted separate on a work stand, other than the ceiling mount, to ensure the laser covers the entire work table, including dual work tables in the dual table machine.

Digital images of different slabs, including the top polished or finished faces 26 with different aesthetic vein characteristics of different slabs, may be stored within a database associated with the controller 46. Different slab cut layout files may be stored with several files possible for an individual slab. The digital image of a top polished face 26 of the slab 24 may include dimensional and material details about the stone slab and data related to its storage, including a unique identifier, the date/time it was stored, the dimensional relationships, including the thickness, length, and width as a rough cut slab, color characteristics, possible purchaser information, and other customer and commercial data related to the slab. Many types of cameras 44 (FIGS. 1 and 10) may be used to take a digital image of the slab 44, including the top polished face 26 of the slab and any reference markers 40, 41. A camera may be incorporated into a manufacturing line and images may be taken when the slab 24 is positioned off the work table 66 from the machine 62. The camera 44 may be a visible light camera, infrared camera, 3D scanning device, time-of-flight camera, structured light scanner, or stereoscopic scanner.

The stone slab 24 may be a molded stone slab or formed from particulate mineral material and may be mixed with pigments and a resin binder and compressed to form a hardened slab.

The dual work table 66 slab processing machine 62 is capable of processing first and second slabs 24 while working on one work table, while the other work table is being set-up via the laser projector 60 in order to perform a "cut and move" process. The dual work tables 66 may be made by first and second adjacent, concrete table bases formed in a slab processing area that will ultimately hold the tables. Each first and second concrete table base may include planar top surface being substantially coplanar with each other in the Z-axis extending along the X and Y axis. At least one stone table slab is secured onto each planar top surface of each table base. The top surfaces of each stone table slab are milled and polished to be substantially level in height along the Z-axis with each other, such as to within a few thousandths of an inch, and more particularly, for example, about 0.001 inch to about 0.003 inches. The height of the milled top surfaces may be calibrated for subsequent stone slab processing at each work table. Crystals may be positioned at outermost corners of the surface of each work table opposite the adjacent work table and calibrated by the laser projecting an optical beam onto the crystals from an overhead laser projector to establish an origin reference for both work tables. The machine may be used for bevel cutting and "farm sink" production.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A system of processing a stone or a stone-like slab having a top polished face and bottom surface, comprising:
- an imaging device configured to receive and display a digital image of the top polished face of the slab, the slab having a plurality of reference markers, each reference marker comprising a top marker on the top polished face and bottom marker on the bottom surface aligned with each other in a line normal to the top polished face and bottom surface; and
- a controller connected to the imaging device and configured to,
  - overlay a slab cut layout on the digital image of the top polished face,
  - generate a digital slab layout file therefrom containing digital data representative of the top polished face and its slab cut layout referenced to the top markers,
  - mirror image the digital slab layout file, and
  - project the mirror imaged locations of the top markers to facilitate alignment of the bottom markers with the respective projected marker locations when the slab is upside down for cutting in a slab cutting position.

2. The system of claim 1 wherein each reference marker comprises an adhesive strip having opposing ends corresponding to top and bottom markers that are aligned when the strip is positioned around a side of the slab.

3. The system of claim 2 wherein each opposing end comprises an enlarged circular portion.

4. The system of claim 1 comprising a laser projector configured to project the mirror imaged locations of the top markers.

5. The system of claim 1 wherein the digital slab image file comprises a vector file.

6. The system of claim 1 comprising a computer numerical control (CNC) slab processing machine having a work surface on which the slab is positioned upside down with respect to the mirror imaged digital slab layout file.

7. The system of claim 6 wherein the CNC slab processing machine comprises a spindle and cutting blade mounted on the spindle.

8. The system of claim 6 wherein the CNC slab processing machine comprises vacuum pods on which the top polished face of the slab is positioned for upside down cutting.

9. A system of processing a stone or a stone-like slab having a top polished face and bottom surface, comprising:
- an imaging device configured to receive and display a digital image of the top polished face of the slab, the slab having opposing short sides and opposing long sides, at least two reference markers on at least one long side and at least one reference marker on at least one short side, each reference marker comprising a top marker on the top polished face and bottom marker on the bottom surface aligned with each other in a line normal to the top polished face and bottom surface; and a controller connected to the imaging device and configured to, overlay a slab cut layout on the digital image of the top polished face, generate a Drawing Exchange Format (DXF) file containing digital data representative of the top polished face and its slab cut layout referenced to the top markers, mirror image the DXF file, and project the mirror imaged locations of the top markers to facilitate alignment of the bottom markers with the respective projected marker locations when the slab is upside down for cutting in a slab cutting position.

10. The system of claim 9 wherein each reference marker comprises an adhesive strip having first and second ends corresponding to top and bottom markers that are aligned when the strip is adhered around a side of the slab.

11. The system of claim 10 wherein each end comprises an enlarged circular portion.

12. The system of claim 9 comprising a laser projector configured to project the mirror imaged locations of the top markers.

13. The system of claim 9 comprising a computer numerical control (CNC) slab processing machine having a work surface on which the slab is positioned upside down with respect to the mirror imaged digital slab layout file.

14. The system of claim 13 wherein the CNC slab processing machine comprises a spindle and cutting blade mounted on the spindle.

15. The system of claim 13 wherein the CNC slab processing machine comprises vacuum pods on which the top polished face of the slab is positioned for upside down cutting.

16. A method of processing a stone or a stone-like slab having side edges and a top polished face and bottom surface, comprising:

adhering a plurality of reference markers over at least one side edge of the slab and onto the top polished face and bottom surface, each of the plurality of adhered reference markers comprising an adhesive strip having a first end formed as a top marker that is adhered to the top polished face and a second end formed as a bottom marker that is adhered to the bottom surface, wherein the top and bottom markers are aligned with each other in a line normal to the top polished face and bottom surface;

overlaying a slab cut layout on the top polished face and generating a digital slab layout file therefrom containing digital data representative of the top polished face and its slab cut layout referenced to the adhered top markers;

mirror imaging the digital slab layout file and projecting the mirror imaged locations of the top markers when the slab is to be positioned in an upside down slab cutting position; and aligning the bottom markers with the respective projected marker locations for upside down cutting of the slab.

17. The method of claim 16 comprising cutting the slab upside down with respect to the mirror imaged digital slab layout file using a computer numerical control (CNC) slab processing machine.

18. The method of claim 17 wherein the CNC slab processing machine comprises a spindle and cutting blade mounted on the spindle.

19. The method of claim 17 wherein the CNC slab processing machine comprises a work surface and vacuum pods on which the top polished face of the slab is positioned for upside down cutting.

20. The method of claim 16 comprising projecting the mirror imaged locations of the top markers using a laser projector.

21. The method of claim 16 wherein top and bottom markers each comprise an enlarged circular portion.

22. The method of claim 16 wherein the slab comprises opposing short sides and opposing long sides, at least one long side includes at least two adhered reference markers and at least one short side includes at least one adhered reference marker.

23. The method of claim 16 wherein the digital slab image file comprises a vector file.

* * * * *